Patented Sept. 26, 1933

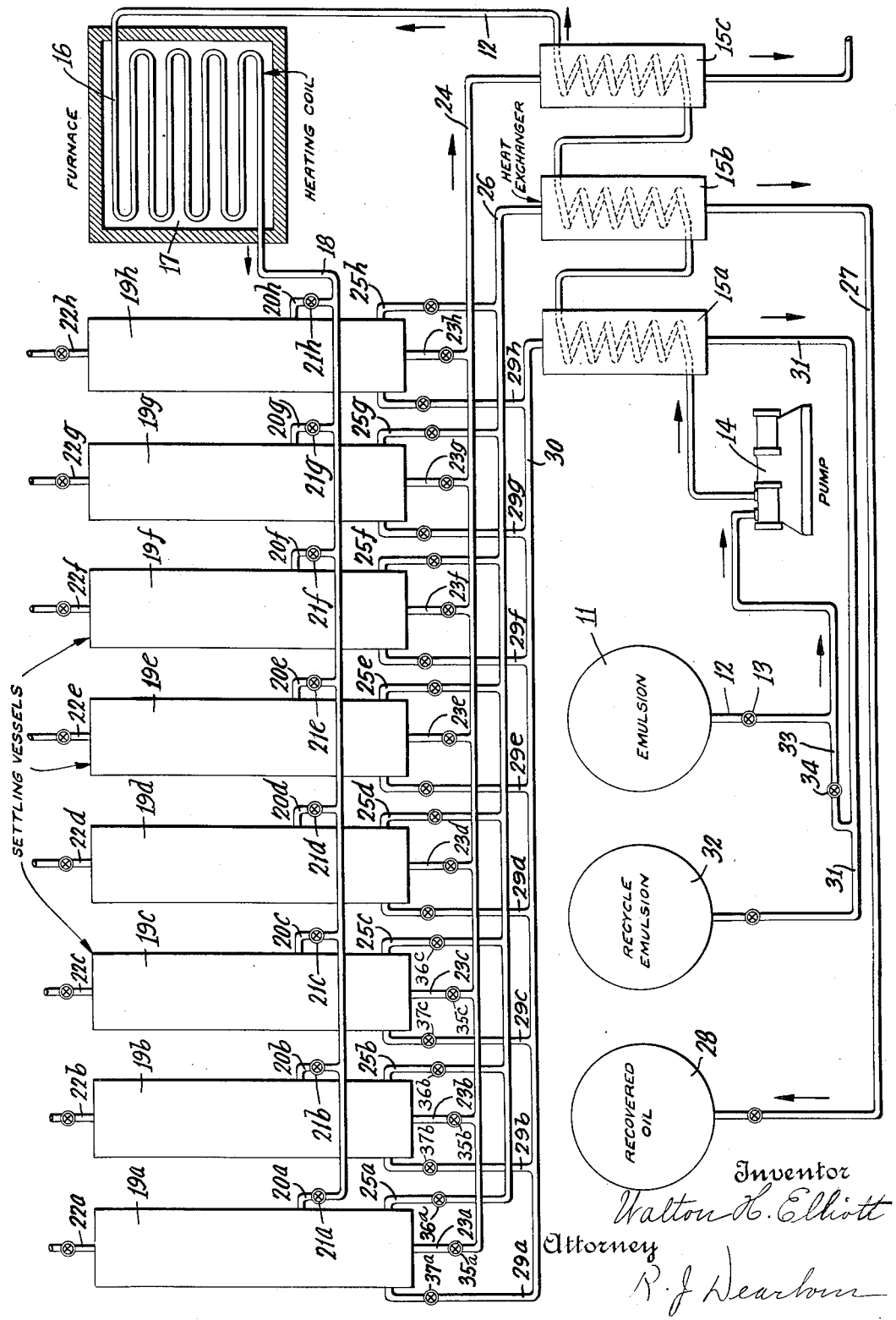

1,928,282

UNITED STATES PATENT OFFICE 1,928,282

DEHYDRATING OILS

Walton H. Elliott, New York, N. Y., assignor to The Texas Company, New York, N. Y., a corporation of Delaware Application January 30, 1929. Serial No. 336,070

1 Claim. (Cl. 196—5)

This invention relates to a process of dehydrating oils.

Stated broadly the invention contemplates a process for separating and resolving emulsions of oil and water by a procedure involving heating the emulsion to a temperature in excess of the boiling point of water and then settling the heated mass, allowing stratification of the separated oil and water to take place. The heated emulsion may be maintained under superatmospheric pressure while the settling takes place.

The invention may be readily understood from a description of the process considered in connection with the single figure of the accompanying drawing, which represents diagrammatically apparatus adapted for use in connection with the operation of the process.

Referring to the drawing, there is provided a source of supply of the emulsion to be treated, such as the tank 11, to which is attached the line 12, fitted with a valve 13, and connecting with the charging pump 14. The line 12 extends through the heat exchangers 15a, 15b and 15c, the purpose of which will be described hereinafter, and continues to the heating coil 16, which is positioned within a suitable furnace 17. The line 18 leading from the heating coil 16 is manifolded at suitable points to connect with the settling vessels 19a, 19b, to 19h, by means of the connecting lines 20a, 20b, to 20h, which are fitted with valves 21a, 21b, to 21h, as shown.

The settling vessels 19a, 19b, etc. may be insulated and are fitted with suitable vent connections 22a, 22b, etc. at their upper ends. At the lower ends of each of the vessels 19a, 19b, etc., three drawoff connections are provided; the lines 23a, 23b, etc., connecting with the manifold line 24, which is in turn connected to the heat exchanger 15c; the lines 25a, 25b, etc., which are connected to the manifold line 26, which is in turn connected to the heat exchanger 15b and thence to the line 27, leading to the storage tank 28; the lines 29a, 29b, etc. connected to the manifold line 30, which in turn connects to the heat exchanger 15a. The line 31 leading from the heat exchanger 15a, is connected to the storage tank 32. A by-pass line 33 connects the lines 12 and 31 and is fitted with the valve 34. The various connecting lines are fitted with suitable valves as shown; thus the lines 23a, 23b etc. are fitted with valves 35a, 35b etc. the lines 25a, 25b etc. with valves 36a, 36b etc., and the lines 29a, 29b etc. with valves 37a, 37b etc.

The operation of the process carried on in connection with the apparatus shown in the drawing may be as follows:—

The emulsion from the tank 11, which may be practically any type of oil and water emulsion, is forced by means of the pump 14 through the line 12, through the heat exchangers 15a, 15b, 15c, and into the heating coil 16 heated by the furnace 17. Herein the emulsion is heated to a suitable temperature, which may be, for example, in the neighborhood of 400° F. A suitable pressure, for example about 250 lbs. per square inch, is maintained in the coil to prevent substantial vaporization.

Passing from the heating coil 16, the heated emulsion is directed through line 18 to the settling vessels 19a, 19b, etc. The valved connections to the vessels are so arranged that they may be cut off from communication with each other, both through the charging line and through the drawoff line, and in carrying on the process in a continuous manner the settling vessels may be charged or filled with the heated emulsion consecutively. For example, the vessel 19a may first be charged, the valves in the lower drawoff connections being closed and the vent connection 22a partly open to allow displacement of air. When the vessel has become substantially filled with the charge, the vent 22a may be closed, the valve 21a closed and the valve 21b opened, thereby diverting the charge of heated emulsion into the vessel 19b. This procedure may be followed throughout the series of settling vessels, and the heated emulsion is allowed to build up a pressure within the settling vessels which will depend somewhat upon the temperature maintained therein, but preferably will be sufficient to prevent boiling of the contents.

As each settling vessel 19 is filled it is cut off from communication with the rest of the apparatus and the contents of the vessel thus may be maintained under elevated temperature and pressure in a quiescent state, during which time settling and stratification of the oil and water takes place. The time of settling required may vary somewhat with the different types of emulsions under treatment, but ordinarily will amount to only a few hours. It is desirable that the apparatus be designed in such manner that the capacity of the heating coil and of the settling vessels will be so related as to afford continuous operation of the coil while the various individual settling vessels are going through the cycle of charging, settling and discharging.

After settling of the heated emulsion has taken place for the required length of time, stratification will have taken place in the vessel, usually with the production of an upper layer of substantially moisture-free oil, a lower layer of water and an intermediate layer of unseparated emulsion. The quantity of the unseparated emulsion will vary with the time of settling and with the more or less refractory nature of the emulsion. The lower layer consisting of water may be withdrawn from each individual settling vessel, as for example 19a, through its corresponding connection 23a, by the opening of the valve 35a. The hot water thus passes through the manifold line 24 and the heat exchanger 15c in heat exchange relation with the incoming cold charge to which it gives up a large portion of its heat. Thereafter the water may be discarded.

After the discharge of the lower water layer, there remain only two layers in the vessel 19a, etc., the lower of which is the unseparated portion of the emulsion. The valve 35a may now be closed and the valve 37a opened, thus permitting the layer of emulsion to be drawn off through the line 29a to the manifold line 30, thence through the heat exchanger 15a, where a large portion of its heat is transferred to the incoming cool charge, and then to the storage tank 32. If desired, the emulsion collected in the storage tank 32 may be recycled to the separating system either alone or admixed with the fresh emulsion from the tank 11. Thus the by-pass line 33, fitted with the valve 34, affords a means of supplying the contents of the tank 32 to the charging line 12 and the charging pump 14.

The water and the unbroken portion of the emulsion having been drawn off from the settling vessel 19a, there remains only the separated oil, which may be drawn off through the line 25a by closing the valve 35a and 37a and opening the valve 36a. The hot oil passes through the manifold line 26 and the heat exchanger 15b, wherein it gives up a portion of its heat to the incoming charge, and thence to the storage tank 29, wherein it is stored for future disposition.

Under certain conditions it has been found that a reduction in temperature and pressure in the settling vessels 19 may aid in breaking refractory emulsions. For example, the emulsion may be introduced into the settling vessel at a temperature of 400° F. and at a pressure of 250 lbs. per square inch. Upon being allowed to cool, the pressure will drop rapidly, and upon reaching a temperature below the boiling point of water, the pressure may be reduced below atmospheric. The vacuum thus produced and maintained at this stage of the treatment may prove instrumental in causing a separation of the oil and water. In order to produce comparatively rapid cooling, means may be provided (not shown) in the apparatus whereby a cooling medium may be circulated through coils in the settling vessels, or cooling may be applied by other suitable means.

Obviously many modifications and variations of the invention, as hereinbefore set forth, may be made without departing from the spirit and scope thereof, and therefore, only such limitations should be imposed as are indicated in the appended claim.

What I claim is:

The method of breaking an emulsion of hydrocarbon oils and water which comprises heating the emulsion under superatmospheric pressure, introducing the heated emulsion under pressure to a closed settling zone, applying cooling to said zone whereby a reduction in temperature and pressure is effected, said pressure being reduced below atmospheric, and thereafter withdrawing separately layers of oil and water formed in said zone.

WALTON H. ELLIOTT.